I. L. LANDIS.
Devices for Detaching Horses.

No. 146,920.

Patented Jan. 27, 1874.

WITNESSES.
Henry N. Miller
C. L. Evert.

INVENTOR
Israel L. Landis
Alexander

By

Attorneys.

UNITED STATES PATENT OFFICE.

ISRAEL L. LANDIS, OF LANCASTER, PENNSYLVANIA.

IMPROVEMENT IN DEVICES FOR DETACHING HORSES.

Specification forming part of Letters Patent No. 146,920, dated January 27, 1874; application filed January 2, 1874.

CASE B.

*To all whom it may concern:*

Be it known that I, ISRAEL L. LANDIS, of Lancaster, in the county of Lancaster and in the State of Pennsylvania, have invented certain new and useful Improvements in Device for Detaching Horses; and do hereby declare that the following is a full, clear, and exact description thereof, reference being had to the accompanying drawings and to the letters of reference marked thereon making a part of this specification.

The nature of my invention consists in the construction and arrangement of a device for detaching horses from vehicles, as will be hereinafter more fully set forth.

In order to enable others skilled in the art to which my invention appertains to make and use the same, I will now proceed to describe its construction and operation, referring to the annexed drawing, in which—

Figure 1:
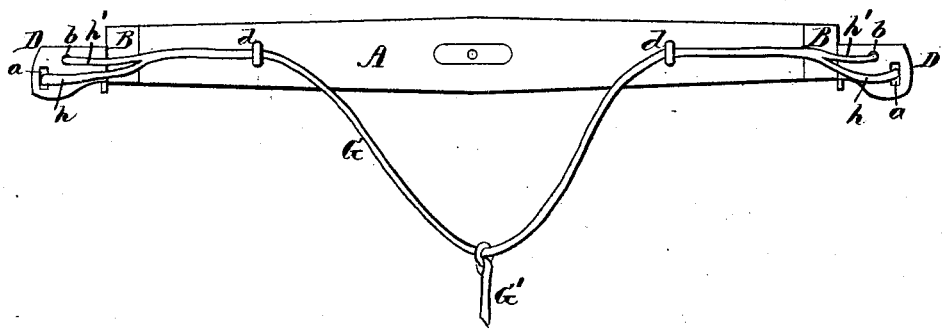
Figure 2:
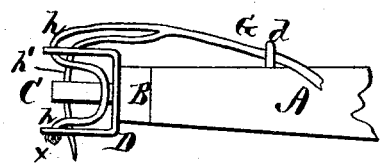
Figure 3:
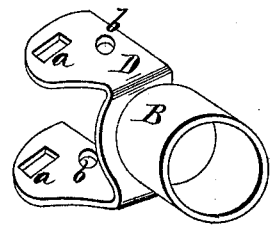

Figure 1 is a plan view of a whiffle or single tree embodying my invention. Fig. 2 is a side view of one end of the same; and Fig. 3 is an enlarged perspective view of the ferrule at the end of the whiffletree.

A represents the ordinary whiffletree or single-tree, provided at each end with a ferrule, B, and pin C, upon which latter the trace is placed. Upon the outer end of each ferrule B is formed or attached a plate, D, bent so as to extend one end above, and the other end below, the pin C, the ends of the plate being a sufficient distance apart to admit the trace between them. Each end of the plate D is provided with a slot, $a$, and a hole, $b$, corresponding with the slot and hole in the other end, and the two holes being on a line with a hole in the end of the pin C. G represents a leather strap passing through two eyes, $d\ d$, on top of the whiffletree, a suitable distance from each end. The ends of the strap G are each split or divided into two parts, $h$ and $h'$.

The part $h$ is passed through the slots $a\ a$ in the ends of the plate D, and has a knot, $x$, tied on its end to prevent it being withdrawn from said plate. When the trace is placed on the pin C, the part $h$ is drawn in between the two ends of the plate D, substantially as shown in Fig. 2, after which the part $h'$ is passed through the holes $b\ b$ in the plate, and the hole in the pin C thereby holding the trace on the pin. To the center of the strap G is attached another strap, G', which is to pass into the vehicle, so as to be within easy reach of the driver. By pulling on this strap G' the ends of the strap G are drawn inward, the parts $h'$ passing out of the holes in the pins C, and the parts $h$, being pulled straight, force the traces outward off from said pins, thus quickly and effectively detaching the horse from the vehicle.

Having thus fully described my invention, what I claim as new, and desire to secure by Letters Patent, is—

1. The plate D, attached to and forming part of the ferrule B, and having its ends bent outward and provided with slots $a$ and holes $b$, substantially as and for the purposes set forth.

2. The combination, with a single-tree, A, having ferrules B and pins C, of the plates D, having their ends bent outward and provided with slots $a$ and holes $b$, and the strap G, having its ends split to form the parts $h$ and $h'$, all substantially as and for the purposes set forth.

In testimony that I claim the foregoing I have hereunto set my hand this 10th day of December, 1873.

ISRAEL L. LANDIS.

Witnesses:
A. N. MARR,
E. McB. TIMONEY.